(12) United States Patent
Shields et al.

(10) Patent No.: US 12,551,741 B2
(45) Date of Patent: Feb. 17, 2026

(54) RIDGE SEAL FOR FIRE SPRINKLER

(71) Applicant: Tyco Fire Products LP, Lansdale, PA (US)

(72) Inventors: Steven L. Shields, Lubbock, TX (US); William K. Rucker, Lubbock, TX (US); Lyle J. Miller, Milford, CT (US); Daniel Cross, South Kingston, RI (US)

(73) Assignee: Tyco Fire Products LP, Cranston, RI (US)

( * ) Notice: Subject to any disclaimer, the term of this patent is extended or adjusted under 35 U.S.C. 154(b) by 575 days.

(21) Appl. No.: 17/779,754

(22) PCT Filed: Dec. 29, 2020

(86) PCT No.: PCT/IB2020/062520
§ 371 (c)(1),
(2) Date: May 25, 2022

(87) PCT Pub. No.: WO2021/137157
PCT Pub. Date: Jul. 8, 2021

(65) Prior Publication Data
US 2023/0001249 A1    Jan. 5, 2023

Related U.S. Application Data

(60) Provisional application No. 62/954,969, filed on Dec. 30, 2019.

(51) Int. Cl.
*A62C 37/11* (2006.01)
*B05B 15/65* (2018.01)

(52) U.S. Cl.
CPC .............. *A62C 37/11* (2013.01); *B05B 15/65* (2018.02)

(58) Field of Classification Search
CPC ................................ A62C 37/11; B05B 15/65
USPC ........................... 169/37, 90, 38, 39, 40, 41
See application file for complete search history.

(56) References Cited

U.S. PATENT DOCUMENTS

| 891,279 A | 6/1908 | Martin |
| 4,294,281 A * | 10/1981 | Gerdes ................. F16K 17/196 251/359 |
| 4,901,799 A | 2/1990 | Pepi et al. |
| 5,195,592 A | 3/1993 | Simons |
| 6,112,821 A * | 9/2000 | Yokoi .................... A62C 37/12 169/41 |
| 6,308,784 B1 | 10/2001 | Mears |
| 6,520,265 B2 | 2/2003 | Winebrenner |
| 2016/0038777 A1 | 2/2016 | Abels et al. |

OTHER PUBLICATIONS

U.S. Patent and Trademark Office as International Searching Authority; International Search Report and Written Opinion; PCT/IB2020/062520; dated May 21, 2021; 8 pages.

* cited by examiner

*Primary Examiner* — Christopher S Kim
(74) *Attorney, Agent, or Firm* — Foley & Lardner LLP

(57) ABSTRACT

A sprinkler includes a body, a button, and a spring. The body includes an opening and a shoulder arranged around a sprinkler axis. The spring including an aperture that receives the button, a first spring surface, and a second spring surface. At least one of (i) the shoulder includes a first extension that contacts the first spring surface and (ii) the button includes a second extension that contacts the second spring surface.

16 Claims, 9 Drawing Sheets

RIDGE SEAL FOR FIRE SPRINKLER

CROSS-REFERENCE TO RELATED APPLICATIONS

The present application claims the benefit of and priority to U.S. Provisional Application No. 62/954,969, filed Dec. 30, 2019, the disclosure of which is incorporated herein by reference in its entirety.

BACKGROUND

Buildings and other areas can include sprinklers that provide fire protection. In the event of a fire, the sprinklers can dispense a fluid so as to suppress or extinguish the fire or to protect building elements from exposure to heat radiating from the fire.

SUMMARY

At least one aspect relates to a sprinkler. The sprinkler includes a body, which includes an opening and a shoulder arranged around a sprinkler axis. The sprinkler includes a button disposed within the body. The sprinkler includes a spring having an aperture that receives the button such that the spring is arranged concentrically about the sprinkler axis, a first spring surface that contacts the body, and a second spring surface that contacts the button. At least one of (i) the shoulder includes a first extension that contacts the first spring surface and (ii) the button includes a second extension that contacts the second spring surface.

At least one aspect relates to a sprinkler system. The sprinkler system includes one or more pipes in fluid communication with a fluid supply. The sprinkler system includes a sprinkler body, which includes an opening and a shoulder arranged around a sprinkler axis. The sprinkler system includes a button disposed in the body. The sprinkler system includes a spring between the shoulder and the button. At least one of (i) the shoulder includes a first extension that contacts the first spring surface and (ii) the button includes a second extension that contacts the second spring surface.

At least one aspect relates to a method of providing a sprinkler. The method includes providing a body including an opening and a shoulder arranged around a sprinkler axis. The method includes providing a button within the body. The method includes providing a spring that includes a first spring surface and a second spring surface such that at least one of (i) a first extension of the shoulder contacts the first spring surface and (ii) a second extension of the button contacts the second spring surface.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure generally relates to a fire sprinkler. More particularly, the present disclosure relates to a fire sprinkler that includes a ridged sealing component that can provide one or more fluid seals within the fire sprinkler. Fire protection systems include sprinklers that can inhibit or permit flow of fluid (typically water, but also in some applications fire suppressant fluid) depending upon conditions. In the instance of a fire or detected conditions that may be indicative of a fire (e.g., increased heat, smoke, etc.), the sprinklers can permit the flow of fluid such that the fluid may contact a deflector and be dispersed so as to provide exposure protection to a window and/or wall. The sprinklers may disperse water or fire protection fluid over a specific area, for example a portion of a room or hallway, or a window or wall. In order to accomplish fire exposure protection for a given area (e.g., room, hallway, window, wall, etc.), sprinklers can include components that permit flow of fire protection fluid in response to activation of one or more fire sprinklers. For example, a fire sprinkler may include one or more components that provide a fluid seal, thus preventing passage of fire protection fluid when the fire sprinkler is in an inactivated state. However, these components may permit passage of fire protection fluid upon activation of the fire sprinkler, thus providing fire protection fluid to the given area.

Fire protection fluid can be supplied to a fire sprinkler via a fluid supply and/or a network of piping. A seal can be provided within the fire sprinkler so as to retain the fire protection fluid within the fluid supply and/or piping until the fire sprinkler is activated. The fire protection fluid can be stored in the fluid supply and/or piping in a pressurized state such that the fire protection will exit the fire sprinkler upon activation at a flow velocity and volumetric flow rate sufficient to provide fire protection or suppression for a desired area. One or more seals disposed within the fire sprinkler can provide a seal that retains the pressurized fire protection fluid. In various applications, the fire protection fluid may be stored at different pressures and, accordingly, the seals of the fire sprinkler can accommodate the pressurized fluid.

Figure 1:
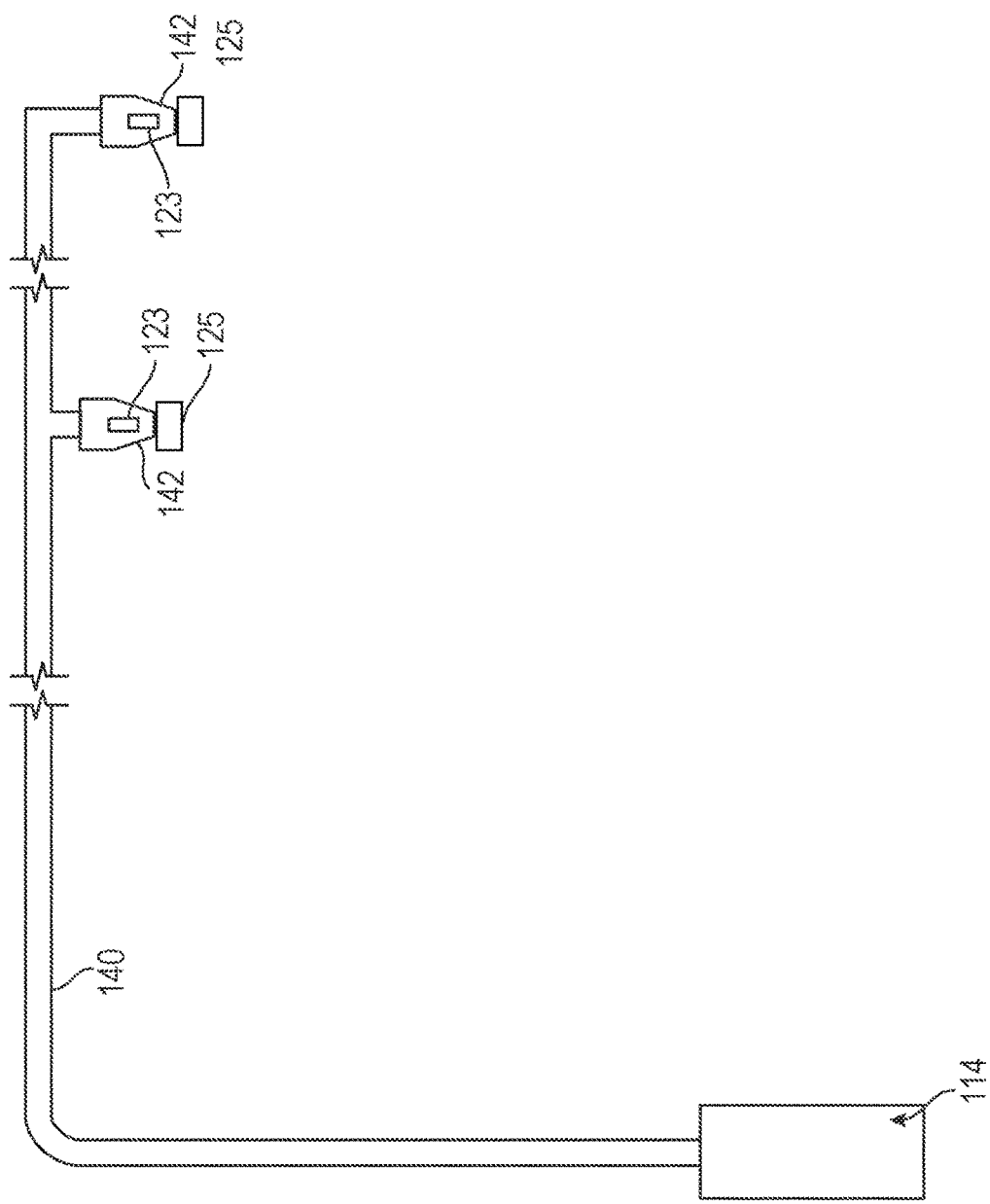
FIG. 1 is a block diagram of a fire suppression system.

FIG. 1 depicts a fire suppression system 100. The fire suppression system 100 can be a chemical fire suppression system. The fire suppression system 100 can distribute a fire suppressant agent onto or nearby a fire, extinguishing the fire and preventing the fire from spreading. The fire suppression system 100 can be used alone or in combination with other types of fire suppression systems (e.g., a building sprinkler system, a handheld fire extinguisher). Multiple fire suppression systems 100 can be used in combination with one another to cover a larger area (e.g., each in different rooms of a building).

The fire suppression system 100 can be used in a variety of applications. The fire suppression system 100 can be used with a variety of fire suppressant agents, including but not limited to water (e.g., may use powders, liquids, foams, or other fluid or flowable materials).

The fire suppression system 100 can include or be coupled with a fluid supply 114. The fluid supply 114 can define an internal volume filled (e.g., partially filled, completely filled) with fire suppressant agent. The fluid supply 114 can provide fluid from a remote location to a building in which the fire suppression system 100 is located.

Piping 140 (e.g., one or more pipes, tubes, conduits) can be fluidly coupled with one or more sprinklers 142. The sprinklers 142 can receive water or other fire suppressant agent from the fluid supply 114 via the piping 140. The sprinklers 142 each define one or more outlets, through which the fire suppressant agent exits and contacts a deflector 125 (which may incorporate features of deflector 212 described with reference to FIG. 2), such as to form a spray of water or other fire suppressant agent that covers a desired area. The sprays from the sprinklers 142 then suppress or extinguish fire within that area. The deflectors 125 of the sprinklers 142 can be shaped to control the spray pattern of the fire suppressant agent leaving the sprinklers 142. The sprinklers 142 can be used as concealed sprinklers.

The sprinklers 142 can include an activation element (e.g., thermal element) 123. The activation element 123 can change from a first state that prevents fluid flow out of the sprinkler 142 to a second state that permits fluid flow of the sprinkler 142 responsive to a fire condition. For example, the activation element 123 can include a glass bulb including a fluid that expands responsive to an increase in temperature (e.g., responsive to heat provided to the fluid from a fire), such as to cause the glass bulb to break responsive to the temperature meeting or exceeding a threshold temperature.

Figure 2:
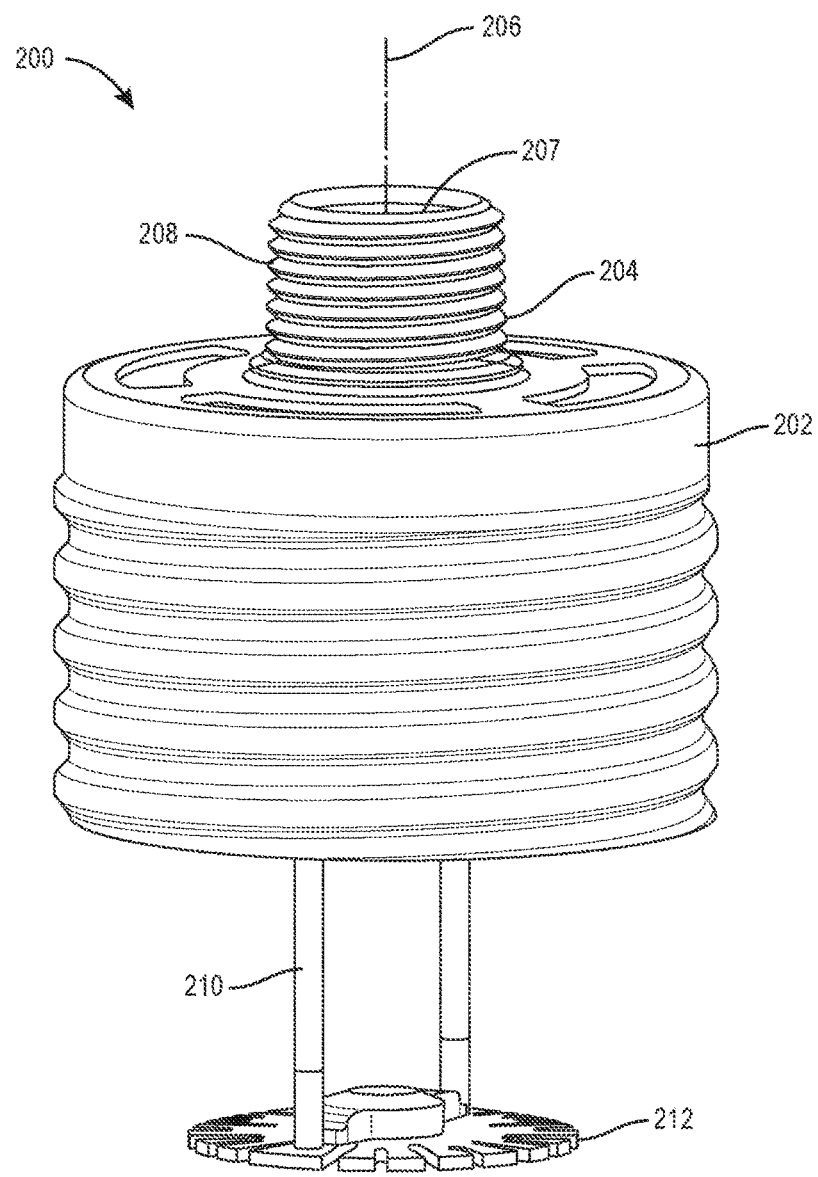
FIG. 2 is a perspective view of a fire sprinkler.
Figure 3:
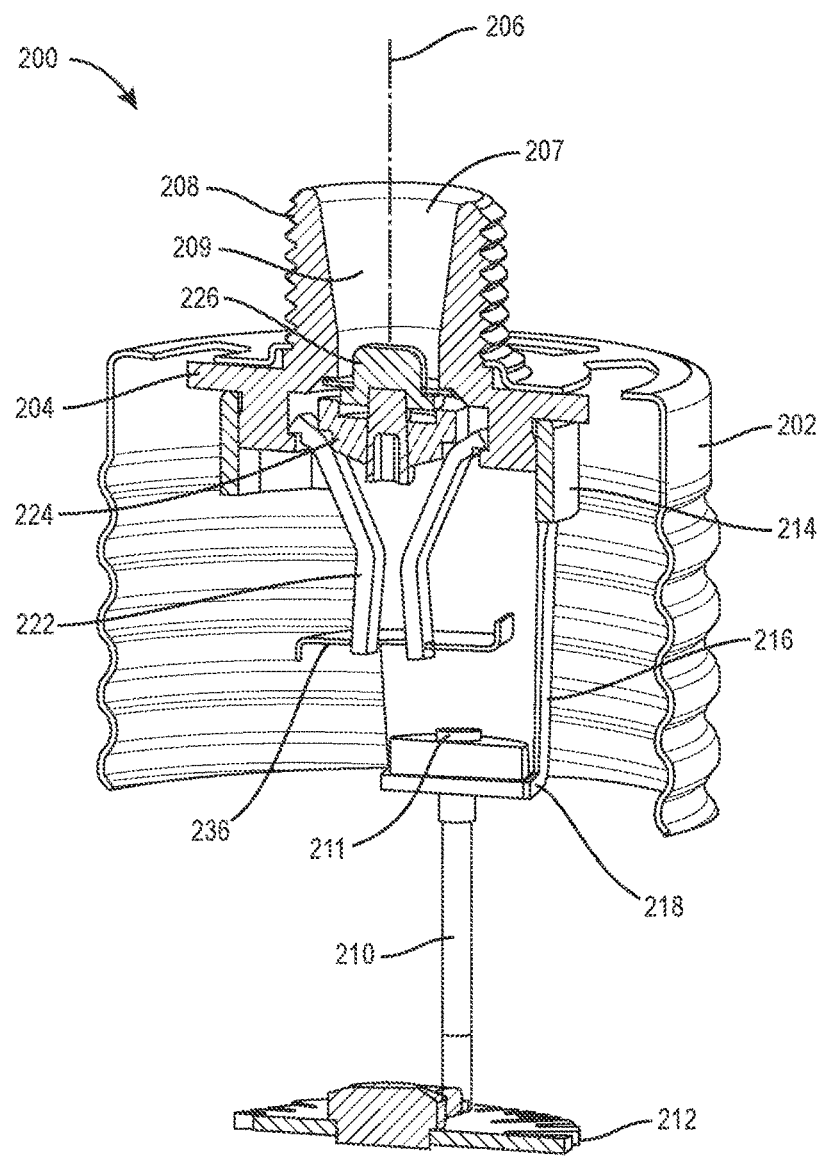
FIG. 3 is cross-sectional view of a fire sprinkler.
Figure 4:
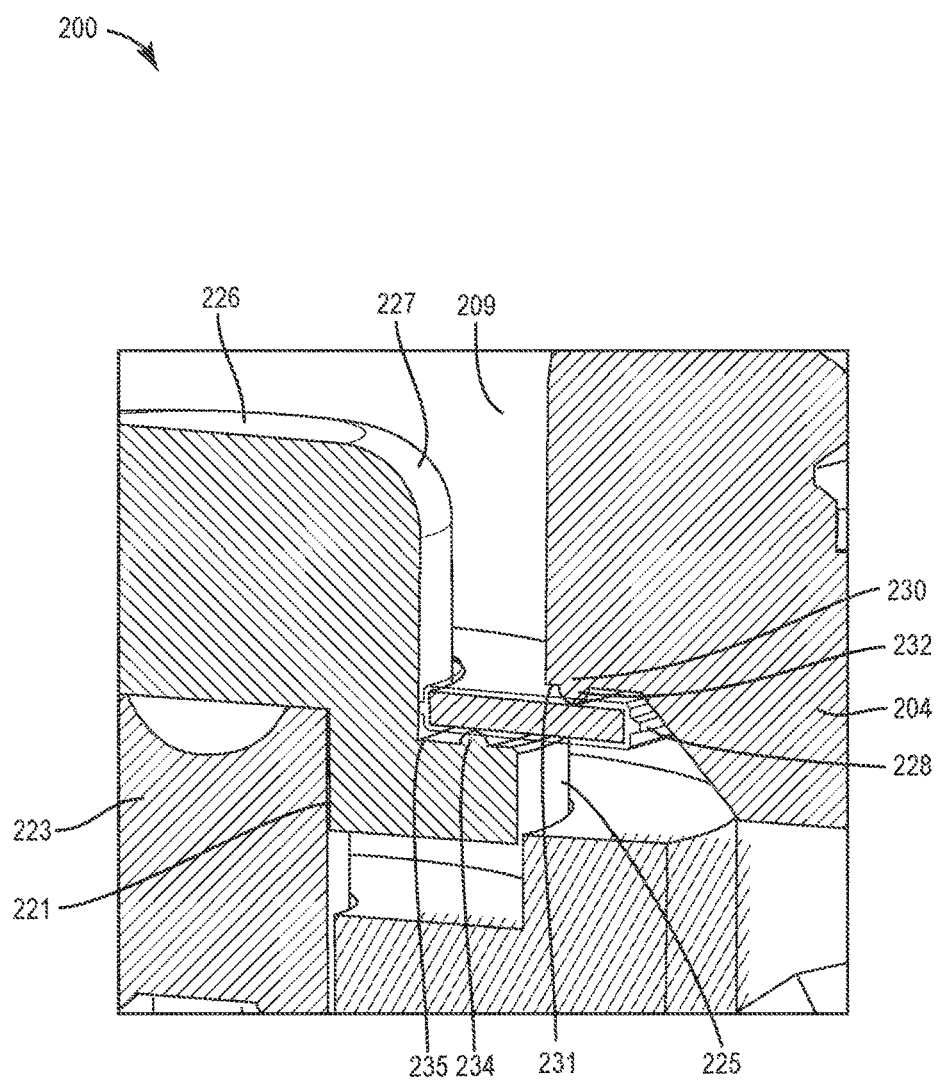
FIG. 4 is an enlarged cross-sectional view of a fire sprinkler.

FIGS. 2-4 depict a sprinkler 200. The sprinkler 200 can incorporate features of the sprinkler 142 described with reference to FIG. 1. The sprinkler 200 includes a housing 202 that can be coupled with a body 204. The housing 202 may be coupled with the body 204 through one or more coupling mechanisms, for example threading or a snap fit. The housing 202 may be releasably coupled with the body 204, for example to facilitate installation and other processes for the sprinkler 200. As depicted in FIGS. 2-4, the body 204 is positioned around a sprinkler axis 206. The housing 202 is coupled with the body 204 such that a portion of the housing 202 surrounds at least a portion of the body 204 in a lateral dimension. The body 204 includes a coupler 208 (which is depicted as a threading, but may comprise other couplers/coupling components) extending from the body (e.g., extending vertically from the body in the frame of reference depicted in FIG. 2) and protruding from the housing. The coupler 208 is positioned around the sprinkler axis 206, and can include an opening 207 disposed at an end of the coupler 208 opposite the housing 202. The opening 207 can be adjacent to a channel 209, where the channel is defined by inner walls of the body 204. The channel 209 may extend into and through the body 204 along the sprinkler axis 206. The channel 209 may have a cylindrical geometry, or may include portions in which the geometry of the channel is tapered or widened as defined by inner walls of the body 204. When the sprinkler 200 is activated, fire suppression fluid may flow from a fluid supply through the channel 209. In some aspects, fire suppression fluid may be retained within the channel 209 or a portion thereof when the sprinkler 200 is in an inactivated state. In an inactivated state, sprinkler 200 includes fluid seals within the body. Fluid seals within the body are formed by applying force to one or more sealing elements by frame arms and thermal elements of the sprinkler 200 to prevent fire suppression fluid from being communicated from a fluid supply line through the body 204 and dispersed over an area. In an activated state, frame arms and thermal elements applying force to sealing elements cease to apply force to sealing elements as thermal elements rupture in response to a condition (e.g., melting from heat exposure, rupture of volume in response to gas expansion, etc.) and thus frame arms lose contact with the body 204 of the sprinkler 200. Responsive to activation of the sprinkler 200 (e.g., which can cause one or more seals to be released, such as seals formed between spring components (e.g., Belleville springs, etc.) and buttons, as well as seals formed between spring components and geometries within the body 204 of the sprinkler 200) the fire suppression fluid can flow through the channel 209 past one or more seals released in response to the activation of the sprinkler 200 such that fire suppression fluid may be dispersed from the body 204 such that the fire suppression fluid may be distributed and/or deflected to an area.

The coupler 208 can couple with a fluid supply (e.g., a portion of a pipe system such as piping 140 and/or fluid supply 114 as depicted in FIG. 1, etc.). The opening 207 provides fluid communication between the body 204 (and components disposed within the body) and the fluid supply such that fire suppression fluid may be communicated from the fluid supply and into the body 204 of the sprinkler 200. The fluid supply can provide fire suppression fluid to the sprinkler 200 via the opening 207, such that the fire suppression fluid may be dispensed from the sprinkler 200 upon activation of the sprinkler 200 (e.g., in response to a fire).

The sprinkler 200 is shown to include a frame 214 coupled with an inferior portion of the body 204. As shown, the frame 214 is coupled with the body 204 via an exterior shoulder of the body 204, where the exterior shoulder of the body 204 can extend in a radial direction outward from the body 204 such that the frame 214 may contact the exterior shoulder of the body to achieve coupling. In some aspects, the frame 214 may be coupled with the body 204 through other coupling mechanisms, for example threading or a snap-fit. The frame 214 includes an upper portion shown to be coupled with the inferior portion of the body 204, where the upper portion of the frame 214 is substantially cylindrical. For example, as shown in the example aspect of FIG. 3, the upper portion of the frame 214 coupled with the inferior portion of the body 204, where the upper portion of the frame 214 has a cylindrical shape with an opening. As shown, the opening of the upper portion of the frame 214 is aligned with the sprinkler axis 206 such that fire suppression fluid may be communicated along the sprinkler axis 206 through a central portion of the frame 214.

The frame 214 includes a pair of legs 216 (with only one leg of the pair of legs shown in FIG. 3) extending in a distal direction from the portion of the frame 214 that is coupled with the inferior portion of the body 204. The pair of legs 216 can be oriented in various manners relative to the frame 214 from one another, such as 180 degrees apart as depicted in the example of FIGS. 2-4. The pair of legs 216 include a pair of feet 218 disposed at distal portions of each leg of the pair of legs 216, with each foot of the pair of feet 218 including an aperture (not shown). The sprinkler 200 further includes a pair of guide pins 210, where each of the guide pins 210 are coupled with a top surface of a deflector 212. The guide pins 210 are sized such that they may be translated vertically within the apertures of the feet 218 such that the deflector 212 may be translated vertically below the frame 214. Each of the guide pins 210 include a head 211. The head 211 can have a lateral dimension greater than that of the apertures of the feet 218 such that the head 211 of each of the guide pins 210 defines a maximum distal position of the deflector 212 when the guide pins 210 are extending from the frame 214. The lateral dimension of the guide pins 210 can be less than that of the apertures such that the guide pins 210 may be translated through the apertures, with the head 211 of each of the guide pins having a lateral dimension greater than that of the apertures such that the head 211 of the guide pins cannot pass through the apertures.

The sprinkler 200 is shown to include a spring 228 arranged within an interior portion of the body 204, as shown in FIG. 4. In some aspects, the spring 228 may be a Belleville spring, or may be a spring other than a Belleville spring. The spring 228 may be annular (e.g., include a central opening extending through a cylindrical component), and may have a flat top surface and bottom surface. The top and bottom surfaces of the spring 228 may include a layer of laminate or other similar substance (e.g., PTFE, etc.). The laminate or other substance may include a thin layer on the top and/or bottom surfaces of the spring 228, for example 0.002 inches of material and 0.0015 inches of adhesive. In some aspects, the laminate and/or adhesive may be compressible (e.g., the dimensions of the laminate and/or adhesive may decrease in response to an applied force from one or more other components/directions).

The top surface and the bottom surface of the spring 228 (which include the laminate or other material) can be flat and may interface with other components of the sprinkler 200. For example, the bottom surface of the spring 228 can contact a first component (which may have a similar flat surface, or may have one or more extensions/protrusions) and the laminate or other material on the top surface can contact a second component (which also may have a similar flat surface, or may have one or more extensions/protrusions). Further to the previous example, the first and/or second components may be the geometry of the housing 202 or a portion thereof, or may be one or more other components of the sprinkler 200. Such contact between the spring 228 and one or more other surfaces may provide a seal (e.g., seal one or more surfaces of the spring relative to the geometry of the body 204 and/or other components of sprinkler 200 to prevent fire suppression fluid from flowing out of the sprinkler 200) such that fluid communication is prevented between a first side of the seal (e.g., fire suppression fluid and/or fluid supply) and a second side of the seal (e.g., a room or other area, or components of the sprinkler 200 that disperse fire suppression fluid over a given area). Such a seal may be formed by the laminate or other material and/or the adhesive deforming relative to the first and/or second surfaces as a force is applied thereby (e.g., a load/loading). The aforementioned seal may be formed by a force applied by the one or more surfaces to the spring 228 such that the laminate or other material and/or the adhesive are compressed. In some aspects, the magnitude of such a force may be directly proportional to the pressure of a fire suppression fluid which the seal can hold (e.g., if a greater force is applied to the laminate by the one or more other surfaces, the corresponding seal that is formed will be capable of withstanding a fire suppression fluid stored at a greater pressure than if a lesser force were applied to the laminate). Ultimately, the sealing capacity of the seal described previously is proportional to the force per unit area applied to the spring 228 via the laminate or other material and/or the adhesive.

The sealing capacity of the seal can correspond to a force per unit area applied to the spring 228 via the geometry of the body 204 and/or other components of the sprinkler 200. Accordingly, increasing the force applied to a constant area can increase the sealing capacity of such a seal. Similarly, if the area to which a constant force is applied decreases, the sealing capacity of such a seal would increase. The equation shown below includes the relationship between the applied force "F", the area to which the force "F" is applied "A", and the corresponding sealing capacity "C".

$C=F/A$

The sprinkler 200 includes a button 226, as depicted in FIGS. 3-4. The button 226 includes a base 225 and an upper portion 227, with the upper portion 227 extending from the base 225. The base 225 and the upper portion 227 can have a cylindrical geometry, where the base 225 has a lesser lateral dimension (e.g., diameter, perimeter, etc. in a plane perpendicular to the sprinkler axis 206 when the button 226 is positioned in the sprinkler 200 in the manner depicted in FIGS. 3 and 4) than that of the upper portion 227. As shown in FIGS. 3-4, the upper portion 227 can be received by the central opening of the spring 228 (as described previously) such that the bottom surface of the spring 228 (including the laminate) contacts an upper surface of the base 225 of the button 226. Accordingly, the spring 228 can be retained laterally by the upper portion 227 of the button 226, and the spring 228 may be translated along the upper portion 227 of the button 226. Additionally, the lateral dimension (e.g., circumference) of the central opening of the spring 228 may be slightly greater than that of the upper portion 227 of the button 226 such that a secure fit can be achieved when the upper portion 227 of the button 226 is received by the central opening of the spring 228.

As depicted in the example of FIG. 4, the upper portion 227 of the button 226 can have a lateral dimension lesser than that of the channel 209 of the body 204. For example, as depicted in FIGS. 3-4, the upper portion 227 of the button 226 extends into the channel 209. In a sealed configuration such as that of the example shown in FIG. 4, the upper portion 227 of the button 226 (as well as the spring 228) may be contacted by fire suppression fluid.

FIG. 4 depicts the button 226 to include an extension 234 disposed on the top surface 235 (e.g., second contact surface) of the base 225. The extension 234 can have a curved geometry from the top surface 235 of the base 225. The extension 234 can extend along the top surface of the base 225 around the upper portion 227 of the button 226 such that the extension 234 is arranged concentrically exterior relative to the upper portion 227. The extension 234 can have various geometries, for example a square or triangular geometry extending upward from the top surface of the base 225. The extension 234 can be spaced approximately equidistant from the upper portion 227 and the lateral edge of the top surface of the base 225. The extension 234 can surround the upper portion 227 in a geometry other than a concentric configuration (e.g., a sinusoidal lateral geometry around the top surface of the base 225 while the extension 234 maintains a constant apex height). The top surface of the base 225 may include multiple extensions, one or more of which may be different than the extension 234. For example, the top surface of the base 225 may include two extensions identical to the extension 234, or a combination of extensions the same as and/or similar to the extension 234 with other extensions having various geometries relative to that of the extension 234.

The extension 234 can contact the bottom surface of the spring 228 to load the spring 228 (e.g., compress the spring 228 and deform the laminate upon the application of a force such that the laminate conforms to the extension 234). Collectively, the extension 234 and the spring 228 can form a fluid seal. For example, the capacity of the seal formed by the extension 234 and the spring 228 can depend on a force per unit area exerted on the spring 228 by the extension 234. For example, by applying a force to the spring from the extension 234 rather than the entirety of the top surface of the base 225 of the button 226, the area over which the force is applied is decreased and thus the sealing capacity of the seal can be increased without increasing the magnitude of the force applied via the button 226. By decreasing the area over which a force is applied to the spring 228 by the button 226 from the entirety of the top surface of the base of the button (which may be substantially flat) to the extension 234, the sealing capacity of the seal created therebetween can be increased (e.g., while maintaining a constant force). With an increased sealing capacity, the sprinkler 200 may retain fire suppression fluid under a greater pressurization and, accordingly, provide more effective fire suppression to a given area and/or provide fire suppression for a greater area. For example, the extensions 232, 234 can enable localized compression stress to remove the need for a higher compression force to increase the seal's maximum pressure limit.

The body 204 is depicted to include a shoulder 230 disposed in an interior portion of the body 204 such that the shoulder is adjacent the channel 209. As depicted in FIG. 4, the shoulder 230 includes an extension 232 adjacent an approximately 45-degree geometry of the body 204. The shoulder 230 may include a right angle or other geometry. The extension 232 can be arranged such that the extension 232 protrudes from a surface 231 (e.g., first contact surface) of the shoulder 230 downward (e.g., toward the spring 228 as depicted in FIG. 4, or toward the frame 214 as depicted in FIG. 3). As depicted in FIG. 4, the extension 232 includes a geometry the same as and/or similar to that of the extension 234 of the button 226. For example, the extension 232 can be rounded and protruding from a substantially flat surface 231. Additionally, the extension 232 (as well as the shoulder 230) can extend around the perimeter of the interior of the body 204 (similar to the extension 234 arranged as a continuous structure about the top surface of the base 225 about the upper portion 227 of the button 226). The shoulder 230 may include a plurality of extensions the same as and/or similar to the extension 232. With reference to both the extension 232 and the extension 234, the extensions may have a semi-circular cross section that defines a radius. The radius can be 0.01 inches (e.g., greater than or equal to 0.05 inches and less than or equal to 0.02 inches, between 0.007-0.015 inches, etc.). The extensions 232, 234 can be ridges.

As depicted in FIG. 4, the extension 232 can contact the top surface of the spring 228 (e.g., opposite the surface of the spring 228 that is opposite the lower surface of the spring 228 contacted by the extension 234). The extension 232 can apply a force against the spring 228 to drive the spring 228 upward (e.g., in the direction of the extension 232) such that the extension 232 contacts the top surface of the spring 228. As a force is applied to the button 226 (as described previously), the button 226 can be driven upward, which translates a force to the spring 228 (thus creating the seal between the spring 228 and the extension 234) and drives the spring 228 upward to contact the extension 232. Upon the application of a force to the spring 228, the spring 228 can contact the extension 232 and deform so as to conform to the geometry of the extension 232 (e.g., a laminate layer of the spring 228 can deform). Accordingly, a seal can be formed similar to that described previously as being formed between the extension 234 and the spring 228.

The capacity of the seal formed between the extension 232 and the spring 228 as a result of the force applied to the spring 228 (and, subsequently, the resistive force applied to the spring 228 by the extension 232 thus forming the seal) can depend on the relationship between the applied force and the area over which said force is applied. For example, if the shoulder 230 did not include the extension 232, then a force (e.g. applied by frame arms in conjunction with thermal elements) would be applied over the entire surface area of the flat portion of the shoulder 230 to the top surface of the spring 228. However, given that the flat portion of the shoulder 230 includes the extension 232, the extension 232 contacts the spring 228 thus decreasing the surface area over which the force is applied. Accordingly and as described previously, the sealing capacity of the seal formed between the extension 232 and the spring 228 can be directly proportional to the force applied per unit area. Thus, both increasing the force and decreasing the area over which any force is applied both increase the sealing capacity of the seal formed between the spring 228 and the extension 232. Increasing the force applied for the seal to be formed presents numerous obstacles, for example machining a variety of new components to meet additional stress or strain parameters. However, the introduction of the extension 232 (and similarly, the extension 234) increases the sealing capacity of the seal by decreasing the area over which the force is applied without increasing the applied force. Accordingly, the fire sprinkler can retain fire suppression fluid stored under a greater pressure. Higher pressurization of fire suppression fluid can enable the sprinkler 200 to provide improved fire suppression for an area or provide fire suppression for an increased area as the fire suppression fluid will be capable of having a greater flow velocity and/or volumetric flow rate when moving through and exiting the sprinkler 200.

With reference to both the extension 232 and the extension 234, it should be noted that the extensions may include various geometries. However, the geometry of the extensions may be determined so that the extensions perform effectively in cooperation with structural and material properties of the spring, such as laminate or other material and adhesive disposed on the top and bottom surfaces of the spring 228. For example, the extensions 232 and 234 may require a geometry that will deform the laminate upon the application of a force such that the laminate conforms to the extensions 232 and 234. However, the geometry of the extensions 232 and 234 should not cause the extensions 232 and 234 to pierce, sever, or otherwise compromise the structural integrity of the laminate or other material and adhesive. Accordingly, as depicted in FIG. 4 the extension 232 and the extension 234 can include substantially smooth, rounded geometries. The sprinkler 200 may vary, for example the composition of the laminate or other material, the adhesive, and also the composition of the extension 232 and the extension 234.

As depicted in FIGS. 2-4, the sprinkler 200 may include the extension 232 and include the extension 234. The sprinkler 200 may include only the extension 232 or only the extension 234. For example, in some applications the sprinkler 200 may not require a sealing capacity beyond a specific threshold. Accordingly, such an application may call for the sprinkler 200 to have one of the extension 232 or the extension 234.

The body 204 can include an connector 224, as depicted in FIGS. 3-4, with the connector 224 disposed in an interior portion of the body 204. The connector 224 includes a protrusion 223 on a top portion thereof that can couple the connector 224 with the button 226 via a recess 221 arranged on a bottom surface of the base 225 of the button 226. The connector 224 can translate a force provided by a pair of arms 222, which are releasably coupled with the interior of the housing (e.g., via a ledge, or other lever configuration) as well as coupled with an activation element 236. The activation element 236 may be configured to activate the fire sprinkler according to one or more stimuli. For example, in the example of FIG. 4, the activation element 236 includes a thermal activation mechanism that undergoes a state change responsive to an external temperature being greater than a threshold temperature (e.g., as described with respect to activation element 123 of FIG. 1).

The activation element 236 can be coupled with each arm of the pair of arms 222 such that each of the arms 222 applies a force to the connector 224, driving the connector 224 in an upward direction (such that said force is translated to the button 226, the spring 228, and the extensions 232 and 234 moving in a direction from the arms 222 toward the extension 232). The activation element 236 can couple with each arm of the pair of arms 222 such that a tension force is applied, with said tension force translated through each arm of the pair of arms 222. Accordingly, each arm of the pair of arms 222 can engage a portion of the interior of the body 204 (as described previously) such that the upward force is applied continuously to the connector 224. The upward force results in the forming of a seal between the extension 232 and the top surface of the spring 228 and the formation of a seal between the extension 234 and the bottom surface of the spring 228. Responsive to activation of the activation element 236, tension between the pair of arms 222 is lost and, accordingly, the application of the upward force is lost. Thus, the seal formed between the extension 232 and the top surface of the spring 228 as well as the seal formed between the extension 234 and the bottom surface of the spring 228 are released (e.g., lost, broken, etc.). The combination of the connector 224, the pair of arms 222 and the activation element 236 can retain the connector in a first state within the interior of the body 204 in which one or more seals are formed (as shown in FIG. 4), and transition to a second state in which the seals are released and fire suppression fluid is allowed to flow through the body 204 responsive to activation of the activation assembly.

Responsive to releasing of the two seals (as described above), fire suppression fluid can be communicated along and through the channel 209 of the body 204 from the opening 207 on the upper portion of the body 204 and exits the channel 209 in a lower portion of the body 204. The fire suppression fluid exits the body 204 via the channel 209 such that the fire suppression fluid contacts the deflector 212 disposed beneath the body 204 (and aligned with the sprinkler axis 206). The deflector 212 can disperse the flow of the fire suppression fluid to provide fire protection and/or suppression for a given area. The deflector 212 may be shaped (e.g., include arrangements of tines) to disperse the fire suppression fluid in one or more desired directions. For example, the deflector 212 may include a protrusion or wall configured to disperse fire suppression fluid over a specific range or area.

Figure 5:
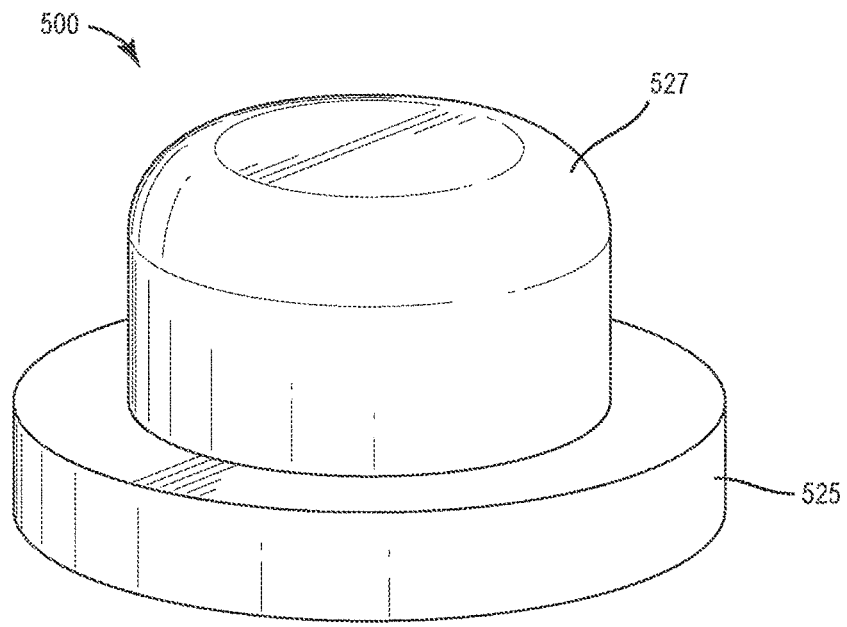
FIG. 5 is a perspective view of a button of a fire sprinkler.
Figure 6:
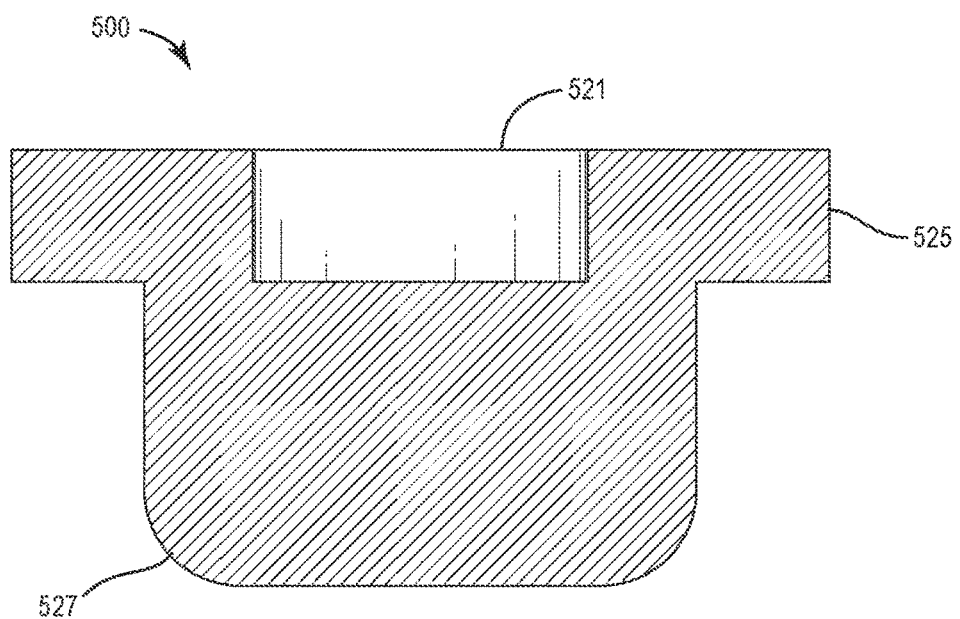
FIG. 6 is a cross-sectional view of a button of a fire sprinkler.

FIGS. 5-6 depict a button 500. The button 500 may be incorporate features of the button 226. The button 500 may be implemented with components of a fire sprinkler, for example the components of the sprinkler 200 depicted in FIGS. 2-4. As mentioned previously, the sprinkler 200 may form a seal between the extension 232 extending from the shoulder 230 and contacting the top surface of the spring 228 and/or form a seal between the extension 234 extending from the top surface of the base 225 of the button 226 and contacting the bottom surface of the spring 228. The button 500 of FIGS. 5-6 does not include an extension such as the extension 234. As depicted, the button 500 includes a base 525 and an upper portion 527, which can incorporate features of the base 225 and upper portion 227 of the button 226 as shown and described previously. The button 500 can include a recess 521 disposed on the bottom surface of the base 525. The recess 521 may receive a protrusion (e.g., the protrusion 223 of the connector 224 as depicted in FIG. 4).

The button 500 may be implemented in applications in which a specific sealing capacity is desirable. Given that the button 500 does not include an extension (e.g., such as the extension 234 of the button 226), the button 500 may be implemented in an aspect similar to the sprinkler 200 but with only a single seal formed that includes an extension. For example, the button 500 may be implemented in conjunction with the components of the sprinkler 200 in place of the button 226. Further to this example, the button 500 may be arranged such that the recess 521 of the button 500 receives the protrusion 223 of the connector 224, and the upper portion 527 may be received by the central opening of the spring 228. Accordingly, the top surface of the base 525 (which does not include an extension) may contact the bottom surface of the spring 228 such that a seal is formed, where this seal has a lesser sealing capacity than that of the sprinkler 200 depicted in FIGS. 2-4 (e.g., the button 500 does not include a an extension). The spring 228, which may be retained laterally by the upper portion 527 of the button 500, may be in contact with the extension 232 of the shoulder 230 of the body 204 such that a seal is formed between the top surface of the spring 228 and the extension 232. Accordingly, such an implementation may be desirable in which a lower sealing capacity is required than that which is achieved by the sprinkler 200 of FIGS. 2-4, with the button 500 compatible in facilitating the formation of the seal between the extension 234 and the top surface of the spring 228 while forming a lower capacity seal between the top surface of the base 525 of the button 500 and the bottom surface of the spring 228.

Figure 7:
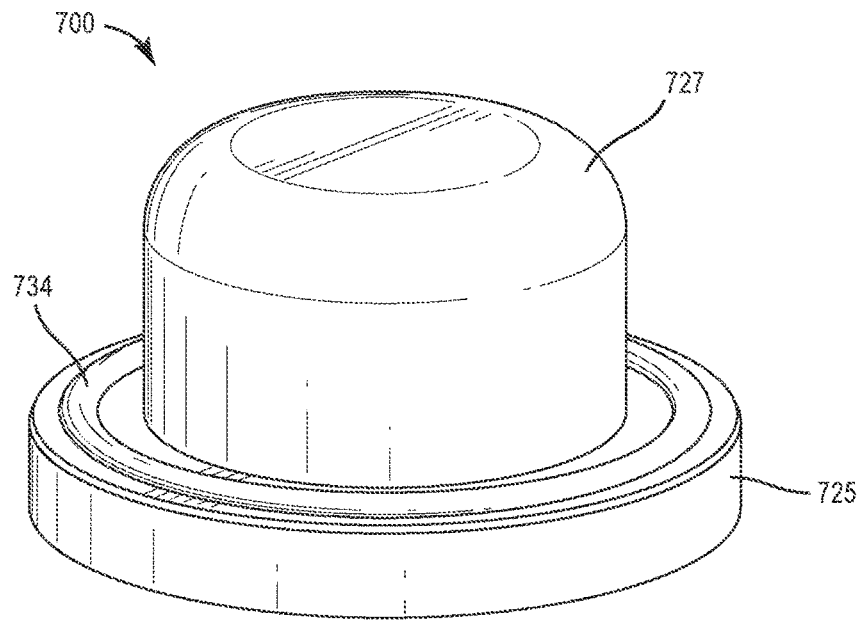
FIG. 7 is a perspective view of a button of a fire sprinkler.
Figure 8:
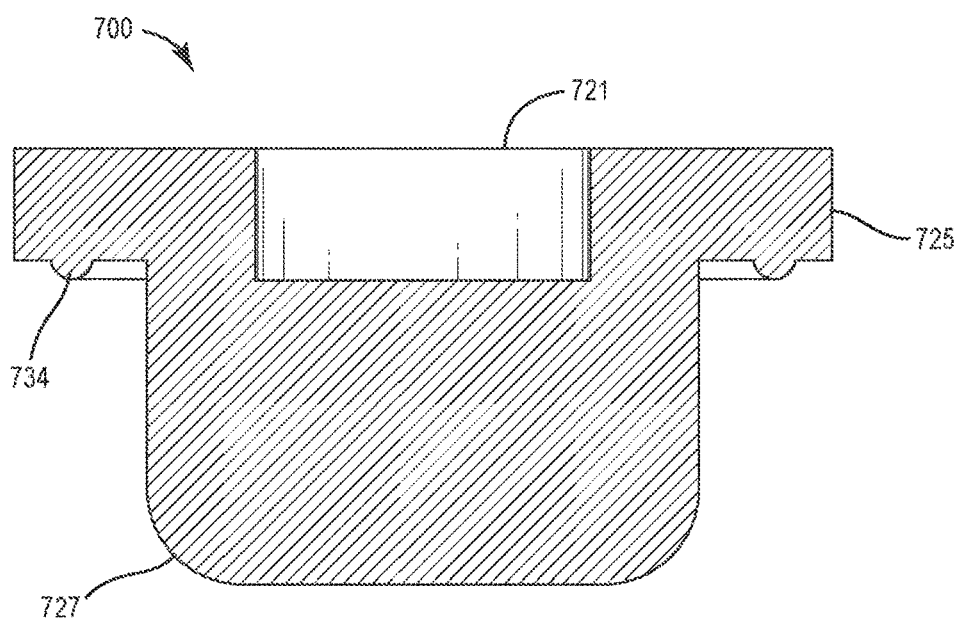
FIG. 8 is a cross-sectional view of a button of a fire sprinkler.

FIGS. 7-8 depict a button 700. The button 700 can incorporate features of the button 226 of FIGS. 2-4 (e.g., size, geometry, dimensions, etc.). The button 700 includes a base 725 which includes an extension 734 extending upward from the top surface of the base 725 (e.g., the same as or similar to the extension 234 of FIGS. 2-4). Thus the button 700 may be implemented in conjunction with a fire sprinkler the same as or similar to the sprinkler 200 as shown and described previously. Further, the button 700 can facilitate the formation of two seals via extensions (similar to the sprinkler 200 with the button 226). For example, as implemented with a fire sprinkler the same as or similar to the sprinkler 200, the button 700 includes a recess 721 configured to receive the protrusion 223 of the connector 224. The extension 734 of the button 700 may contact the bottom surface of the spring 228 forming a first seal, with the button 700 further translating an applied force (e.g., form the activation element 236 via the pair of arms 222) such that a second seal is formed between the extension 232 and the top surface of the spring 228.

The button 700 may be of a different size or have different proportions (e.g., same size base but taller upper portion) than the button 266. The extension 734 may be arranged variously about the top surface of the base 725. For example, the extension 734 may have an angled geometry (e.g., a corner or rounded corner contact the bottom surface of a spring). The button 700 may include a plurality of extensions arranged on the top surface of the base 725 of the button 700, and the extensions can incorporate features of the extension 734.

Figure 9:
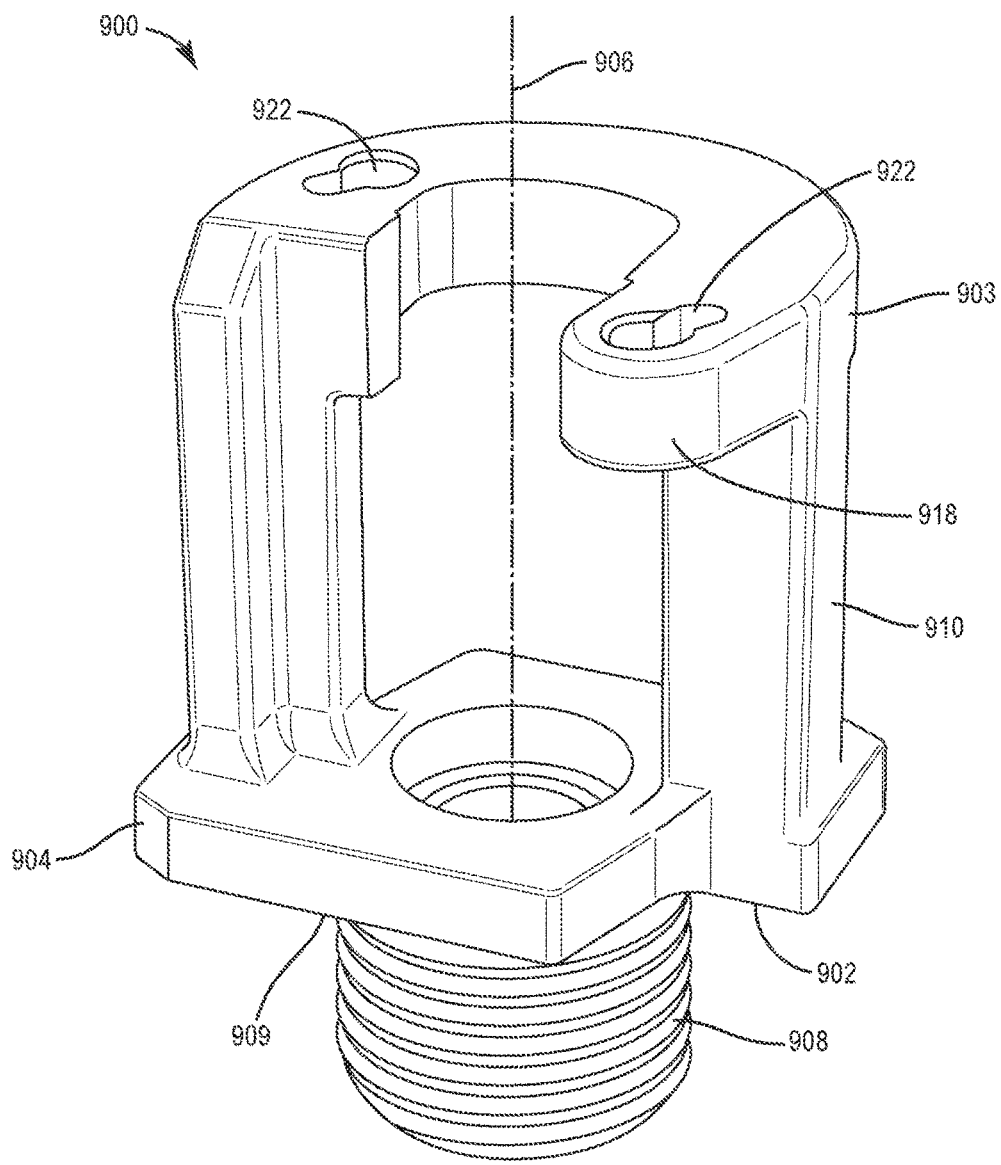
FIG. 9 is a perspective view of a body of a fire sprinkler.
Figure 10:
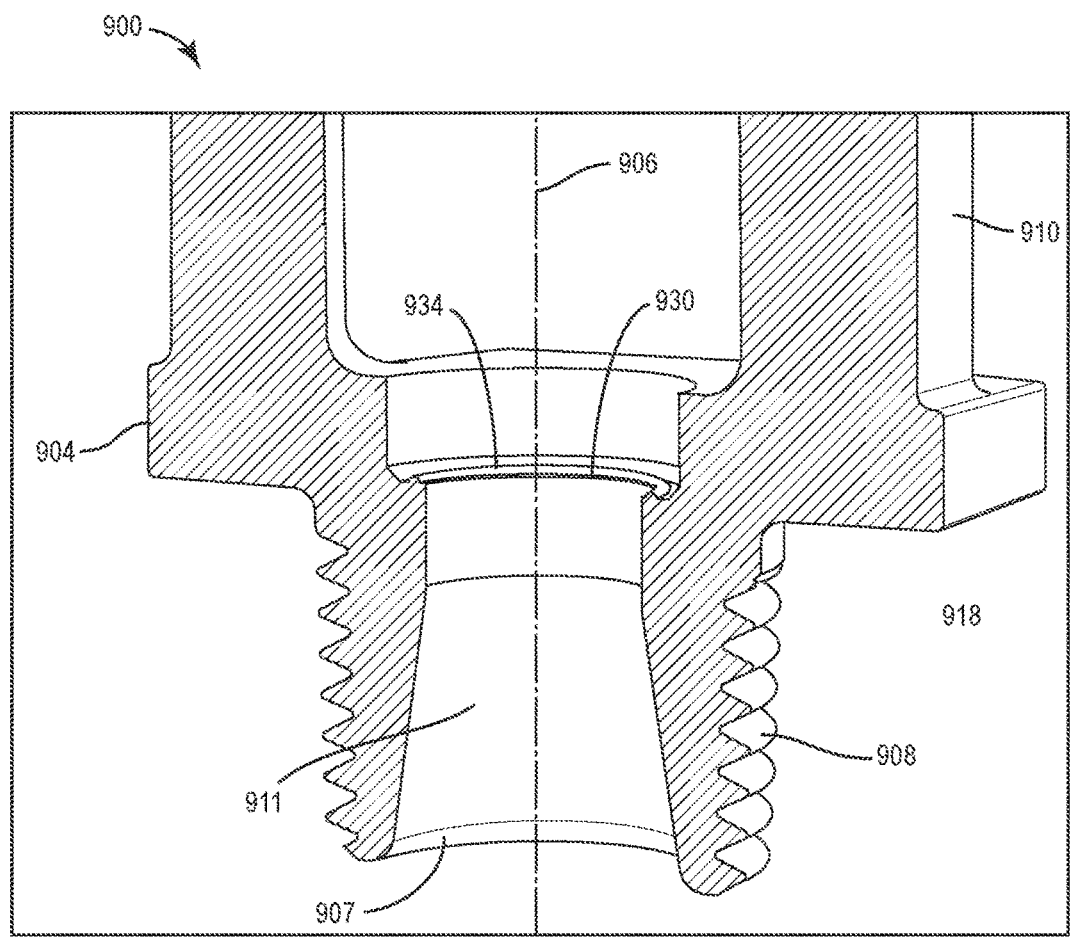
FIG. 10 is a cross-sectional view of a body of a fire sprinkler.

FIGS. 9-10 depict a body 900 of a fire sprinkler. The body 900 includes an upper portion 902 which includes a coupler 908. As depicted, the coupler 908 can include a threading. The coupler 908 may be used with various coupling methods (e.g., snap to fit, etc.). The body 900 includes a channel 911 that extends from an opening 907 (disposed on the upper portion 902) through the body along a sprinkler axis 906. The body 900 includes a frame 904, which can incorporate features of the frame 214 depicted in FIGS. 2-4. While the frame 904 can be integral to the body 900, the frame 904 can include a pair of legs 910 extending from the frame 904 in a direction opposite the coupler 908 (similar to the corresponding components of the sprinkler 200 relative to the frame 214). The body 900 can include a bottom portion 903 disposed opposite the body 900 from the coupler 908. The frame 904 includes a pair of apertures 922 disposed diametrically opposite the frame 904 and disposed on the frame adjacent each of the pair of legs 910 of the frame 914.

The body 900 can accommodate a pair of guide pins that incorporate features of the guide pins 210. The body 900 may accommodate components in an interior portion thereof, for example the button 226, the connector 224, and the spring 228 as shown and described previously. The body 900 may be injection molded with integral components (e.g., the frame 904 and body 900) that do not require coupling (e.g., the body 204 and the frame 214). The body may include materials such as various polymers having material properties advantageous for fire sprinklers (e.g., heat resistance, lightweight, etc.) such as the sprinkler 200, for example.

The body 900 can include a shoulder 930 and an extension 934, as depicted in FIG. 10. The shoulder 930 and the extension 934 may incorporate features of the shoulder 230 and the extension 232 of the sprinkler 200. For example, the extension 934 can extend from a flat surface of the shoulder 930 in a direction opposite the coupler 908. Thus, the extension 934 can facilitate the forming of a fluid seal in a similar manner as described with reference to the spring 228 and the extension 232 (e.g., should the spring 228, the button 226, the connector 224, the activation element 236, and the pair of arms 222 be implemented in conjunction with the body 900).

Figure 11:
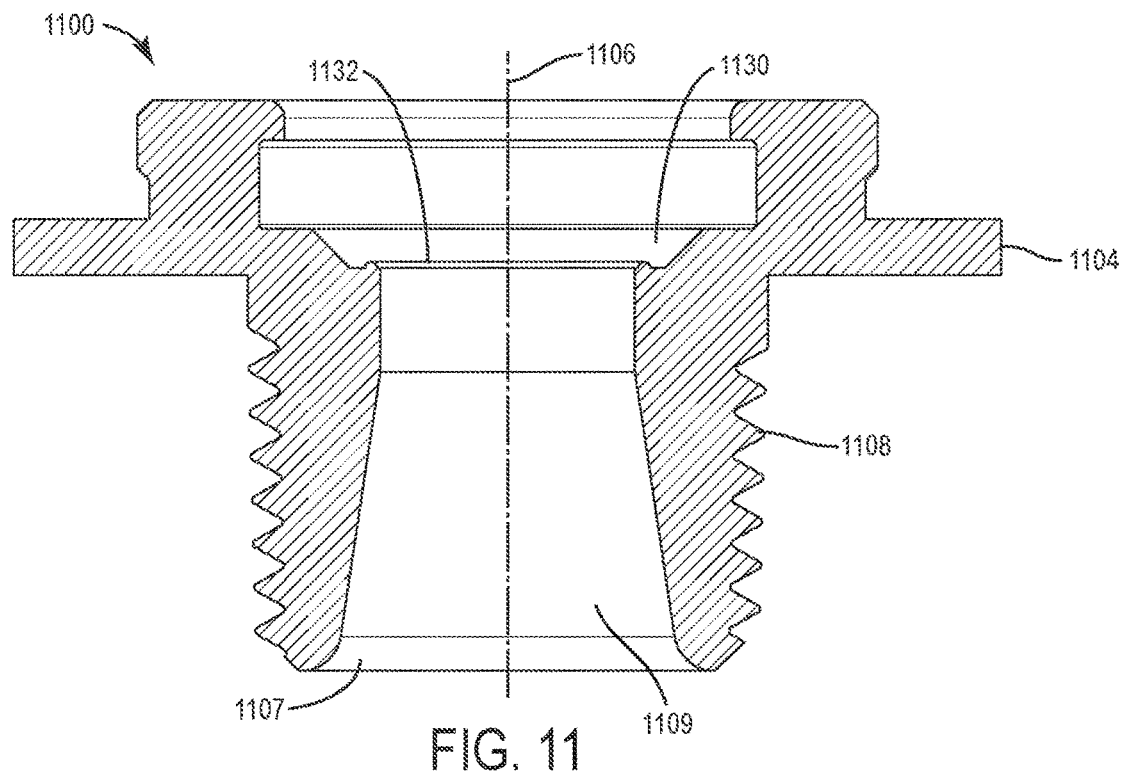
FIG. 11 is a cross-sectional view of a portion of a body of a fire sprinkler.
Figure 12:
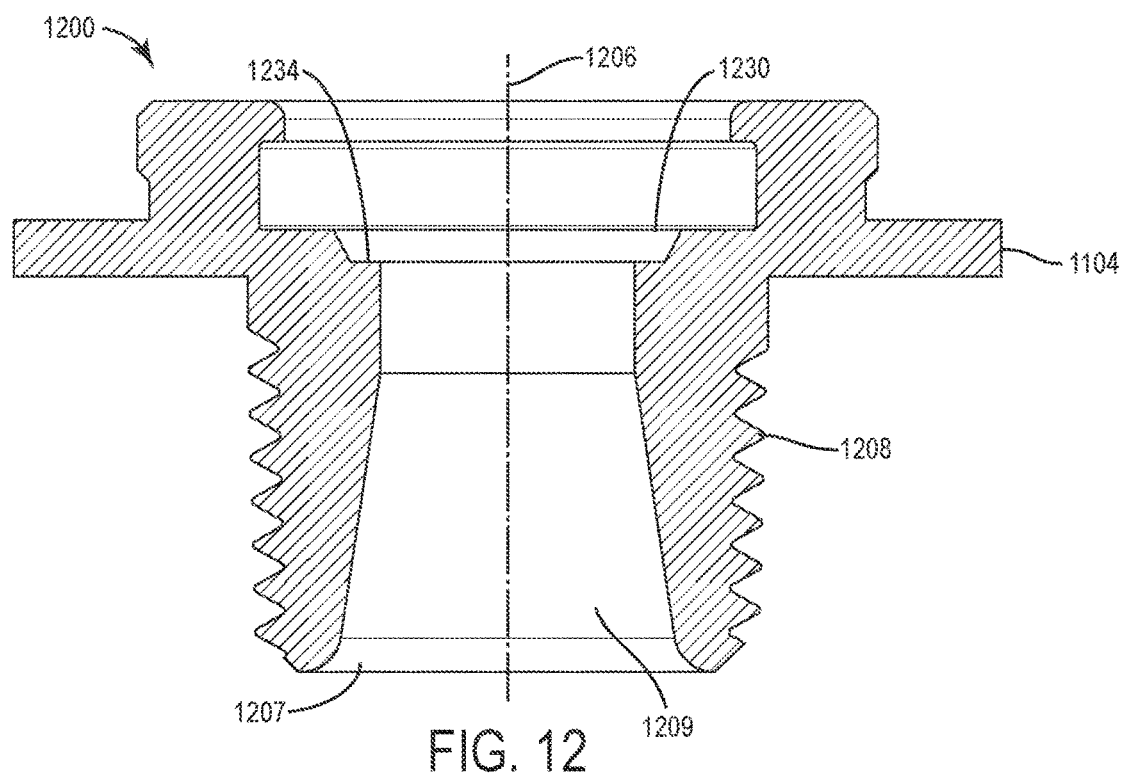
FIG. 12 is a cross-sectional view of a portion of a body of a fire sprinkler.

FIGS. 11-12 depict a body 1100 that includes an upper portion 1104. The body 1100 can incorporate features of the body 204 of the sprinkler 200. The body 1100 includes a coupler 1108. The coupler 1108 can include a threading. The coupler 1108 can use various coupling mechanisms, such as a snap to fit. The body 1100 can include an opening 1107 that extends into an interior portion of the body 1100 forming a channel 1109. The channel 1109 can be disposed about a sprinkler axis 1106. The body 1100 can include a step 1130 (e.g., a "reverse step") disposed adjacent the channel 1109 on the interior of the body 1100. The step 1130 may incorporate features of the shoulder 230 of FIGS. 2-4. The step 1130 can extend around the perimeter of the interior of the body 1100, and can have a constant lateral dimension within the body 1100.

Referring to FIG. 11, the body 1100 can include an extension 1132 extending from a flat surface of the step 1130. The extension 1132 can incorporate features of the extension 232 of the body 204. The extension 1132 can extend from the flat surface of the step 1130 in a direction opposite the coupler 1108. Both the step 1130 and the extension 1132 are continuous in that the step 1130 and the extension 1132 extend about a circular lateral dimension in the interior of the body 1100. The extension 1132 can include a curved geometry, for example with a radius of 0.01 inches. The body 1100 and the step 1130 thereof may include multiple extensions the same as and/or similar to the extension 1132. Both the step 1130 and the extension 1132 can form a seal between the extension 1132 and a spring (e.g., the spring 228).

The body 1200 as depicted in FIG. 12 can include a surface 1234 adjacent the step 1230. Both the step 1230 and the surface 1234 are continuous about a circular lateral dimension of the interior of the body 1200. The combination of the step 1230 and the surface 1234 can cooperate to form a seal between the surface 1234 and a spring (e.g., the spring 228). The surface 1234 can have a surface area that interfaces with and applies a force to the spring 228. For example, by adjusting the surface area of the surface 1234 (e.g., decreasing, making smaller similar to the extensions as discussed previously), the sealing capacity of a seal formed therewith is thus adjusted accordingly. Thus, despite not having an extension feature, the surface 1234 can have a decreased surface area which thus increases the sealing capacity of a seal formed between, for example, the surface 1234 and a top surface of a spring the same as or similar to the spring 228.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sprinkler, comprising;
a body, comprising:
   an opening arranged around a sprinkler axis;
   a channel arranged around the sprinkler axis; and
   a shoulder arranged around the sprinkler axis, the channel between the opening and the shoulder, the shoulder comprising a flat surface and a first extension protruding from the flat surface, the first extension spaced from the channel;
a button disposed within the body; and
a spring comprising:
   an aperture that receives the button such that the spring is arranged concentrically about the sprinkler axis;
   a first spring surface outward from the aperture;
   a first layer of laminate on the first spring surface, the first layer of laminate contacts the first extension;
   a second spring surface outward from the aperture, the first extension contacts the first spring surface; and
   a second layer of laminate on the second spring surface, the second layer of laminate contacts the button.

2. The sprinkler of claim 1, comprising:
the first extension comprises a first ridge contacting the first spring surface of the spring such that a seal is formed that restricts fluid communication through the opening of the body.

3. The sprinkler of claim 1, comprising:
the first extension comprises a step contacting the first spring surface of the spring such that a seal is formed that restricts fluid communication through the opening of the body.

4. The sprinkler of claim 1, comprising:
the button comprises an upper portion and a contact surface that is arranged concentrically relative to the upper portion, the button comprises a second extension that protrudes from the contact surface and contacts the second spring surface of the spring.

5. The sprinkler of claim 1, comprising:
a connector disposed within the body and arranged about the sprinkler axis, the connector couples with the body; and
an activation assembly that releasably retains the connector within the body in a first state such that the first spring surface of the spring contacts the body and the second spring surface contacts the button, the activation assembly releases the connector from the first state responsive to an activation condition to space the body from the first spring surface to allow for fluid communication from a fluid supply line through the opening of the body.

6. The sprinkler of claim 1, comprising:
the button comprises a step contacting the first spring surface of the spring such that a seal is formed that restricts fluid communication through the opening of the body.

7. The sprinkler of claim 1, comprising:
the sprinkler comprises that the button comprises a second extension; and
the second layer of laminate contacts the second extension.

8. The sprinkler of claim 1, comprising:
an activation assembly that comprises a thermal element that breaks in response to an external temperature being greater than a threshold temperature to activate the activation assembly.

9. The sprinkler of claim 1, comprising:
the flat surface comprises a portion between the first extension and the channel.

10. The sprinkler of claim 1, comprising:
the first extension is a ridge that protrudes out of the flat surface.

11. A sprinkler system, comprising:
one or more pipes in fluid communication with a fluid supply;
a sprinkler body coupled with the one or more pipes, the sprinkler body comprising:
   an opening arranged around a sprinkler axis, a channel extending from the opening, and a shoulder arranged around the sprinkler axis, the channel between the opening and the shoulder, the shoulder comprising a flat surface and a first extension protruding from the flat surface, the first extension spaced from the channel;
a button disposed within the sprinkler body; and
a spring between the shoulder and the button, the spring comprises:
   an aperture that receives the button such that the spring is arranged concentrically about the sprinkler axis,
   a first spring surface outward from the aperture,
   a first layer of laminate on the first spring surface, the first layer of laminate contacts the first extension;
   a second spring surface outward from the aperture, the first extension contacts the first spring surface; and
   a second layer of laminate on the second spring surface, the second layer of laminate contacts the button.

12. The sprinkler system of claim 11, comprising:
the first extension comprises a first ridge contacting the first spring surface of the spring such that a seal is formed that restricts fluid communication through the opening of the sprinkler body.

13. The sprinkler system of claim 11, comprising:

the first extension comprises a step contacting the first spring surface of the spring such that a seal is formed that restricts fluid communication through the opening of the sprinkler body.

14. The sprinkler system of claim 11, comprising:

the button comprises an upper portion and a contact surface that is arranged concentrically relative to the upper portion, the button comprises a second extension that protrudes from the contact surface and contacts the second spring surface of the spring.

15. The sprinkler system of claim 11, comprising:

a connector disposed within the sprinkler body and arranged about the sprinkler axis, the connector couples with the sprinkler body; and an activation assembly that releasably retains the connector within the sprinkler body in a first state such that the first spring surface of the spring contacts the sprinkler body and the second spring surface contacts the button, the activation assembly releases the connector from the first state responsive to an activation condition to space the sprinkler body from the first spring surface to allow for fluid communication from a fluid supply line through the opening of the sprinkler body.

16. The sprinkler system of claim 11, comprising:

the button comprises a step contacting the first spring surface of the spring such that a seal is formed that restricts fluid communication through the opening of the sprinkler body.

\* \* \* \* \*